P. C. HEWITT.
VAPOR ELECTRIC APPARATUS.
APPLICATION FILED MAY 13, 1904.
1,069,695.
Patented Aug. 12, 1913.
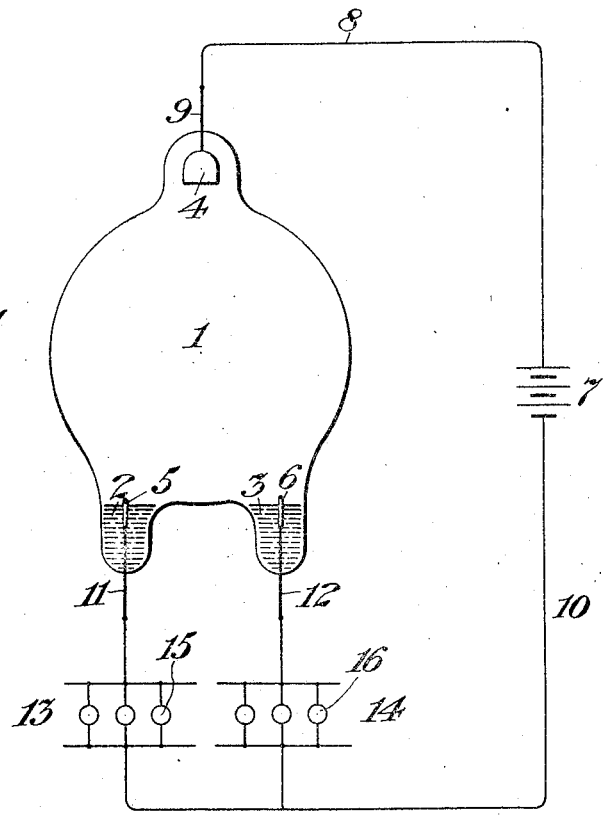
Fig. 1
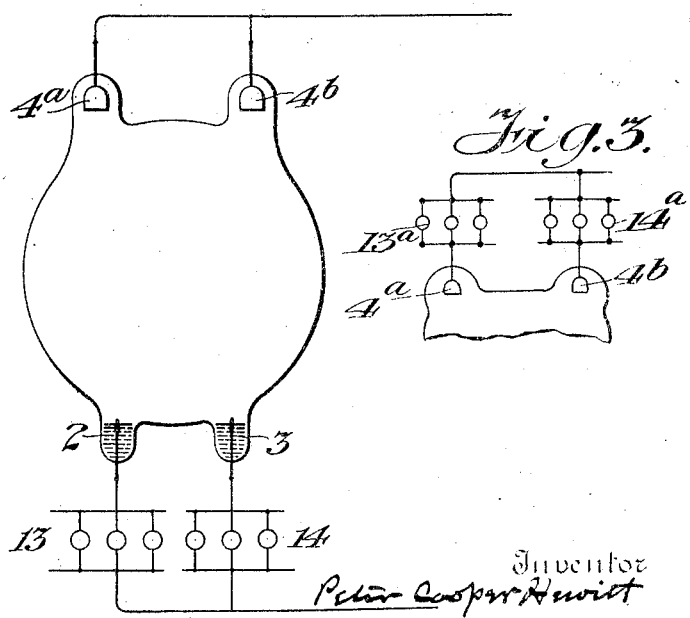
Fig. 2
Fig. 3.
Witnesses
Chas. F. Clagett
W. F. Capel
Inventor
Peter Cooper Hewitt
By his Attorney
Charles A. Terry

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

VAPOR ELECTRIC APPARATUS.

1,069,695. Specification of Letters Patent. Patented Aug. 12, 1913.

Application filed May 13, 1904. Serial No. 207,757.

*To all whom it may concern:*

Be it known that I, PETER COOPER HEWITT, a citizen of the United States, and resident of New York, county of New York, State of New York, have invented certain new and useful Improvements in Vapor Electric Apparatus, of which the following is a specification.

I have found that it is possible to maintain a divided circuit in a vapor electric apparatus, having a plurality of negative electrodes and a common positive electrode. When the point at which the current enters the negative electrode is fixed, as by making use of a platinum or other projecting element capable of forming a meniscus or of being wetted by the material of the negative electrode, I find that the negative electrode characteristics are such that a divided current can be maintained as set forth above. The point of entrance of the current to the negative electrode may be provided through a projection of platinum or other suitable material, or it may be provided by means of a ring of platinum or other suitable material located in the mercury or other liquid constituting the negative electrode. In either case, the meniscus formed around the point or along the edge of contact between the liquid and the ring serves to steady the action of the current at the negative electrode and to insure a uniform connection at the negative electrode so far as the passage of current into the same is concerned, and decreases the tendency of the resistance to vary. In other words the normal resistance at the negative electrode of the vapor apparatus is controllable and made more constant when a projection is utilized for locating the entrance of the current into the negative electrode. Under conditions such as described, the employment of a common positive electrode in combination with two or more negative electrodes is possible. In systems of distribution wherein vapor rectifiers are used, this characteristic is important, and the present invention relates primarily to the utilization of such a characteristic in vapor rectifiers. At the same time, it is not intended to exclude the utilization of the same characteristic in vapor electric apparatus of any character, whether employed as rectifiers or for any other purpose.

For convenience I show the invention in the drawing in connection with vapor rectifiers, the three figures of the drawing each being a diagram of such a rectifier in combination with circuits in which the rectifier may be made useful.

In the first figure of the drawing, 1 is the container of a vapor electric rectifier, 2 and 3 are negative electrodes of mercury, and 4 is a common positive electrode. The electrode 4 may be of iron, graphite, or other suitable material and the electrodes 2 and 3 may be of any volatilizable conducting liquid suited to the purposes of the invention. I have shown platinum points, 5 and 6, projecting above the surface of the electrodes 2 and 3, respectively, the same being typical of devices which may be used in connection with mercury or other electrodes for forming an upward meniscus whereby the entrance of the current into the negative electrodes is facilitated and regulated. At 7 I show a generator of electricity, one pole of which is connected through a conductor, 8, with a lead-wire, 9, extending to the positive electrode 4. From the other side of the generator 7 a conductor, 10, extends in multiple to the negative lead-wires, 11 and 12, through work-circuits, 13 and 14, respectively. The two work-circuits may contain translating devices, 15, 15 and 16, 16, of any suitable character. In practice I have found that a rectifier such as that shown in the drawing will pass current through both the electrodes 2 and 3, and I propose to utilize this characteristic in cases where it is desirable to have separate work-circuits supplied through the same rectifier.

In Figure 2 I show two positive electrodes, 4ª, 4ᵇ, and two negative electrodes, 2 and 3, as before. In the negative electrodes may be included work-circuits, 13 and 14, as before. An apparatus of this sort is found to be operative for systems of distribution such as that illustrated in the figure, and it has the advantage of supplying a single rectifying apparatus in place of a plurality of such devices.

In Fig. 3, applicant shows a modification of Fig. 2 in which the work circuits 13 and 14 here identified as 13ª and 14ª, are placed in the leads of the positive electrodes 4ª and 4ᵇ respectively.

Many other uses for the rectifying apparatus might be devised, and the present invention relates to only one of a variety of applications which could be made of the broad principle of the invention.

As already stated, the utilization of the apparatus as a lamp, instead of a rectifier, is not excluded from the scope of this invention.

The work circuits may be on the negative side of the vapor apparatus, or, in case of two or more positive electrodes on the positive side.

In the claims which follow, the negative electrodes are described as coördinate electrodes. By this expression attention is called to the fact that the several negative electrodes are working electrodes in distinction from supplemental or temporarily operating electrodes.

In a divisional application, Serial Number 669,342, filed January 4th, 1912, claims are made upon certain structural features of the invention herein shown.

I claim as my invention:

1. A vapor electric apparatus having a plurality of negative electrodes and a common positive electrode, in combination with a separate work-circuit connected with each negative electrode.

2. A vapor electric apparatus having a plurality of negative electrodes and a common positive electrode, in combination with a generator supplying current to the apparatus, one pole of such generator being connected to the common positive electrode and the other pole thereof being connected in multiple to the several negative electrodes.

3. A vapor electric apparatus having a plurality of negative electrodes and a common positive electrode, in combination with a generator supplying current to the apparatus, one pole of such generator being connected to the common positive electrode and the other pole thereof being connected in multiple to the several negative electrodes, through separate work circuits.

4. A vapor electric apparatus having a plurality of negative electrodes and a common positive electrode, the negative electrodes being supplied with projections, as described, together with a divided connection from the negative electrodes to the terminal of a suitable source.

5. A vapor electric apparatus having a plurality of negative electrodes composed of a conducting liquid, and a common positive electrode, the negative electrodes being supplied with projections capable of being wetted by the liquid, in combination with a generator supplying current to the apparatus, one pole of such generator being connected to the common positive electrode, and the other pole thereof being connected in multiple to the several negative electrodes.

6. A vapor electric apparatus having a plurality of liquid negative electrodes and a common positive electrode, each negative electrode being supplied with a projection capable of being wetted by the liquid, together with a divided connection from the negative electrodes to the terminal of a suitable source.

7. In an electric circuit a vapor apparatus having a plurality of negative electrodes of conducting liquid, each electrode having a projection capable of being wetted by the said liquid and all being included in a divided circuit, a positive electrode, and a work circuit included in each of the branches of the divided circuit.

Signed at New York, in the county of New York, and State of New York, this 11th day of May, A. D. 1904.

PETER COOPER HEWITT.

Witnesses:
WM. H. CAPEL,
GEORGE H. STOCKBRIDGE.